(12) United States Patent
Cheng et al.

(10) Patent No.: US 10,878,167 B2
(45) Date of Patent: *Dec. 29, 2020

(54) METHOD OF DETERMINING COLORABILITY OF A SEMICONDUCTOR DEVICE AND SYSTEM FOR IMPLEMENTING THE SAME

(71) Applicant: TAIWAN SEMICONDUCTOR MANUFACTURING COMPANY, LTD., Hsinchu (TW)

(72) Inventors: Chung-Yun Cheng, Hsinchu (TW); Chin-Chang Hsu, Banqiao (TW); Hsien-Hsin Sean Lee, Duluth, GA (US); Jian-Yi Li, Hsinchu (TW); Li-Sheng Ke, Hsinchu (TW); Wen-Ju Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,112

(22) Filed: Dec. 11, 2019

(65) Prior Publication Data

US 2020/0117848 A1   Apr. 16, 2020

Related U.S. Application Data

(63) Continuation of application No. 16/272,391, filed on Feb. 11, 2019, now Pat. No. 10,515,185, which is a
(Continued)

(51) Int. Cl.
*G06F 30/30* (2020.01)
*G06F 30/398* (2020.01)
(Continued)

(52) U.S. Cl.
CPC .............. *G06F 30/398* (2020.01); *G03F 1/70* (2013.01); *G06F 30/392* (2020.01); *G06F 2119/18* (2020.01)

(58) Field of Classification Search
CPC .. G06F 30/398; G06F 30/392; G06F 2119/18; G06F 30/39; G03F 1/70; H01L 27/0203; H01L 27/0207
(Continued)

(56) References Cited

U.S. PATENT DOCUMENTS 8,402,396 B2 * 3/2013 Kahng ...................... G03F 1/70
                                                                716/52
8,448,100 B1   5/2013 Lin et al.
(Continued)

*Primary Examiner* — Jack Chiang
*Assistant Examiner* — Brandon Bowers
(74) *Attorney, Agent, or Firm* — Hauptman Ham, LLP

(57) ABSTRACT

A method including decomposing a conflict graph based on a number of masked to be used to manufacture a semiconductor device. The method further includes determining whether the decomposed conflict graph is a simplified graph based on a comparison between the decomposed conflict graph and a stored conflict graph. The method further includes determining whether the decomposed conflict graph is colorable based on a number of masks used to pattern the layer of the semiconductor device. The method further includes indicating that the conflict graph is colorable in response to a determination that the decomposed conflict graph is colorable.

20 Claims, 9 Drawing Sheets

Related U.S. Application Data continuation of application No. 14/990,446, filed on Jan. 7, 2016, now Pat. No. 10,204,205.

(51) Int. Cl.
  *G03F 1/70*  (2012.01)
  *G06F 30/392*  (2020.01)
  *G06F 119/18*  (2020.01)

(58) Field of Classification Search
  USPC .......................................................... 716/52
  See application file for complete search history.

(56) References Cited

U.S. PATENT DOCUMENTS

| | | | |
|---|---|---|---|
| 8,484,607 B1 * | 7/2013 | Tang | G03F 7/70466 716/136 |
| 8,631,372 B2 | 1/2014 | Yu et al. | |
| 8,669,780 B2 | 3/2014 | Chi | |
| 8,701,073 B1 | 4/2014 | Fu et al. | |
| 8,754,818 B2 | 6/2014 | Yen et al. | |
| 2013/0193981 A1 | 8/2013 | Chen et al. | |
| 2013/0246990 A1 | 9/2013 | Yen et al. | |
| 2013/0320553 A1 | 12/2013 | Kuo et al. | |
| 2014/0043148 A1 | 2/2014 | Wang et al. | |
| 2014/0077057 A1 | 3/2014 | Chao et al. | |
| 2014/0092939 A1 | 4/2014 | Chang et al. | |
| 2014/0126089 A1 | 5/2014 | Chang et al. | |
| 2014/0126274 A1 | 5/2014 | Lee et al. | |
| 2014/0167799 A1 | 6/2014 | Wang et al. | |
| 2014/0195728 A1 | 7/2014 | Hsu et al. | |
| 2014/0203397 A1 | 7/2014 | Yen et al. | |
| 2014/0211438 A1 | 7/2014 | Lin et al. | |
| 2014/0239427 A1 | 8/2014 | Huang et al. | |
| 2014/0264772 A1 | 9/2014 | Horng et al. | |
| 2014/0266273 A1 | 9/2014 | Wang et al. | |
| 2014/0372958 A1 * | 12/2014 | Lin | G06F 30/398 716/52 |

* cited by examiner

METHOD OF DETERMINING COLORABILITY OF A SEMICONDUCTOR DEVICE AND SYSTEM FOR IMPLEMENTING THE SAME

PRIORITY CLAIM

The present application is a continuation of U.S. application Ser. No. 16/272,391, filed Feb. 11, 2019, which is a continuation of U.S. application Ser. No. 14/990,446, filed Jan. 7, 2016, the entireties of which are included herein by reference.

BACKGROUND

In semiconductor fabrication processes, when features in a single layer of a semiconductor device are positioned closer than patterning resolution permits, multiple masks are often used in order to pattern the features. The features of the single layer of the semiconductor device are separated into different masks so that each mask includes features which are separated by a distance equal to or greater than a patterning resolution parameter. In some instances, a process using two masks is called double patterning and a process using three masks is called triple patterning.

While designing a semiconductor device, designers will lay out the features of the semiconductor device in a layout pattern. These layout patterns include commonly used structures which are stored as standard cells in a cell library. A cell library is a database of standard cells which a designer can use in order to efficiently insert commonly used structures in a layout pattern while avoiding the extra task of designing each structure for each different semiconductor device.

In some instances, these standard cells are checked to determine whether the standard cell is colorable based on a number of masks used to form the single layer of the semiconductor device. A cell is colorable if the features of the cell are able to be separated into the number of masks with each mask maintaining a separation of the features greater than or equal to the patterning resolution parameter. For example, a standard cell which is compatible with a double patterning process is called 2-colorable, and a standard cell which is compatible with a triple patterning process is called 3-colorable.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
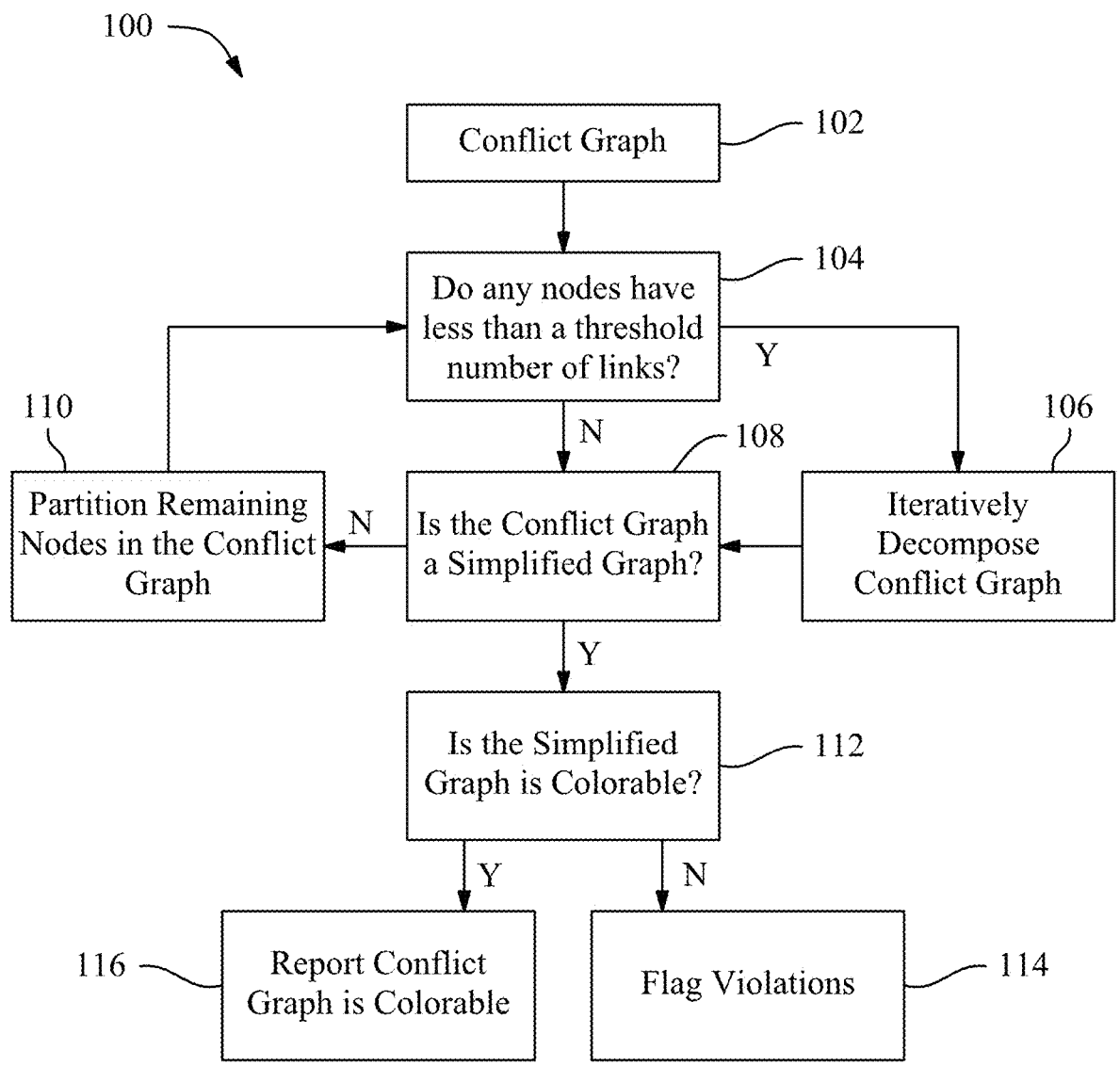
FIG. 1 is a flowchart of a method of determining colorability of a semiconductor device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a flow chart of a method 100 of determining colorability of a semiconductor device in accordance with some embodiments. In operation 102, method 100 receives a conflict graph. A conflict graph is a representation of features of the semiconductor device which are positioned within a G0 spacing distance from other features in the design. The features are nodes which are connected by links to other features (nodes) which are within the G0 spacing for manufacturing the semiconductor device. In some embodiments, Q0 spacing is used in place of G0 spacing depending on a number of masks used to pattern a layer of a semiconductor device. For example, Q0 spacing is used for quadruple patterning; and G0 spacing is used for double patterning, in some embodiments. Conflict graphs are used to assist with the colorability analysis. As a number of features included in a conflict graph increase and as a number of links within the conflict graph increase, analysis and modification of the layout become more complex and time consuming. Method 100 helps to reduce the complexity and arduous task of determining colorability of a conflict graph.

In some embodiments, the conflict graph is received from an external component in operation 102. In some embodiments, the conflict graph is generated based on a received layout in operation 102. In some embodiments, the layout and the conflict graph are generated in operation 102, based on received information from a user or an external component.

In operation 104, the conflict graph is analyzed to determine whether any nodes in the conflict graph have less than a threshold number of links. In some embodiments, the threshold number of links is equal to a number of masks used to pattern a layer of the semiconductor device. For example, if a number of masks used to pattern a layer of the semiconductor device is four, i.e., quadruple patterning, the threshold number of links is four, i.e., the conflict graph is analyzed to determine if any nodes have three or fewer links. In some embodiments, the threshold number of links is four. In some embodiments, the threshold number of links is greater than or less than four.

The analysis in operation 104 is performed by a specific purpose processing device including hardware configured to execute instructions for evaluating a conflict graph and identifying a number of links connected to each node. In some embodiments, a number of links connected to each node is displayed to a user. In some embodiments, a schematic view of the conflict graph is displayed to the user.

If the conflict graph is determined to include any nodes having less than the threshold number of links, then method 100 proceeds to operation 106. The conflict graph is iteratively decomposed in operation 106. Decomposition of the conflict graph includes removing nodes having less than the threshold number of links and reducing a number of links of remaining nodes previously connected to the removed node. The decomposition is performed iteratively in order to remove nodes whose number of links is reduced to be below the threshold by a previous removal of another node. Operation 106 continues until all nodes within the conflict graph have a number of links equal to or greater than the threshold number of links. If the conflict graph includes no nodes having less than the threshold number of links, the operation 106 does not result in any changes in the conflict graph. A detailed description of a decomposition process for a conflict graph is provided in U.S. application Ser. No. 13/955,780 (US Pre-Grant Publication No. 2015/0040083), which is incorporated herein by reference in its entirety.

Operation 106 is performed by a specific purpose processing device configured to execute instructions for decomposing a conflict graph. In some embodiments, operation 106 is performed using a same specific purpose processing device as that used in operation 104. In some embodiments, a different specific purpose processing device is used to perform operation 106 from that used to perform operation 104.

Figure 2:
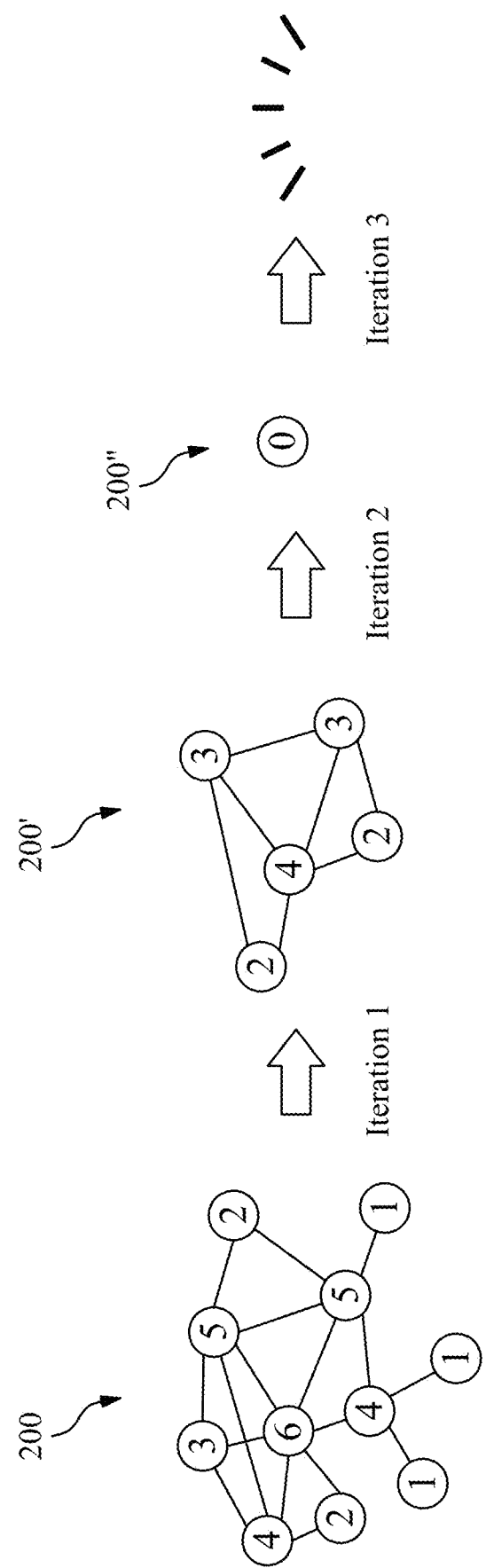
FIG. 2 is an example of a decomposition of a conflict graph in accordance with some embodiments.

FIG. 2 is an example of a sequential decomposition of a conflict graph in accordance with some embodiments. Conflict graph 200 includes 11 nodes. For clarity, a number of links connected to each node is written within each node. In the example of FIG. 2, the number of masks for patterning the layer of the semiconductor device is four, so the threshold number of links is four. In iteration 1, all nodes of conflict graph 200 having less than four links are removed to produce conflict graph 200'. In conflict graph 200', the number of links for each of the nodes is reduced based on the removal of nodes in iteration 1. In iteration 2, the nodes having less than four links are again removed to produce conflict graph 200". Only one node remains in conflict graph 200", so the node has no links and is removed in iteration 3 to result in a conflict graph having zero nodes. FIG. 2 is an example of decomposition of a conflict graph. In some embodiments, a number of masks used to pattern the layer of the semiconductor device is more or less than four. In some embodiments, a number of iterations of the decomposition process is more or less than three.

Returning to FIG. 1, in operation 108, the decomposed conflict graph is analyzed to determine whether the conflict graph is a simplified graph. A simplified graph is a conflict graph which satisfies at least one of the following conditions: 1) all nodes are removable by operation 106, i.e., a decomposed conflict graph has zero nodes; 2) the conflict graph is not capable of further partitioning; or 3) the conflict graph matches a previously analyzed conflict graph. A decomposed conflict graph having all nodes removable by operation 106 indicates that the conflict graph is colorable and is defined to be a simplified graph. A conflict graph which is not able to be further partitioned indicates that additional processing of the conflict graph would not reduce complexity of the conflict graph. A conflict graph which matches a stored conflict graph is useable to reduce a number of iterations of method 100, based on historical information from previously analyzed conflict graphs. For example, if the decomposed conflict graph matches a previously analyzed conflict graph the colorability of the decomposed conflict graph is able to be determined based on the colorability of the previously analyzed conflict graph, i.e., if the previously analyzed conflict graph is colorable, then the current conflict graph is also colorable.

Considerations for determining whether the conflict graph is capable of partitioning are discussed below with respect to operation 110.

Operation 108 is performed by a specific purpose processing device configured to execute instructions for identifying a simplified graph. In some embodiments, operation 108 is performed using a same specific purpose processing device as that used in at least one of operation 104 or operation 106. In some embodiments, a different specific purpose processing device is used to perform operation 108 from that used to perform operation 104 and operation 106.

If operation 108 determines that the conflict graph is not a simplified graph, then method 100 continues to operation 110. In operation 110, the remaining nodes in the conflict graph are partitioned. The nodes in the conflict graph are partitioned based on predetermined partition rules determined by a number of masks used to pattern the layer of the semiconductor device. In some embodiments, the partition rules are defined by a user and input into a specific purpose processing device for executing operation 108. In some embodiments, the partition rules are received from an external component. In some embodiments, the specific purpose processing device for executing operation 108 generates or recommends the partition rules based on the number of masks used for patterning the layer of the semiconductor device.

Figure 3:
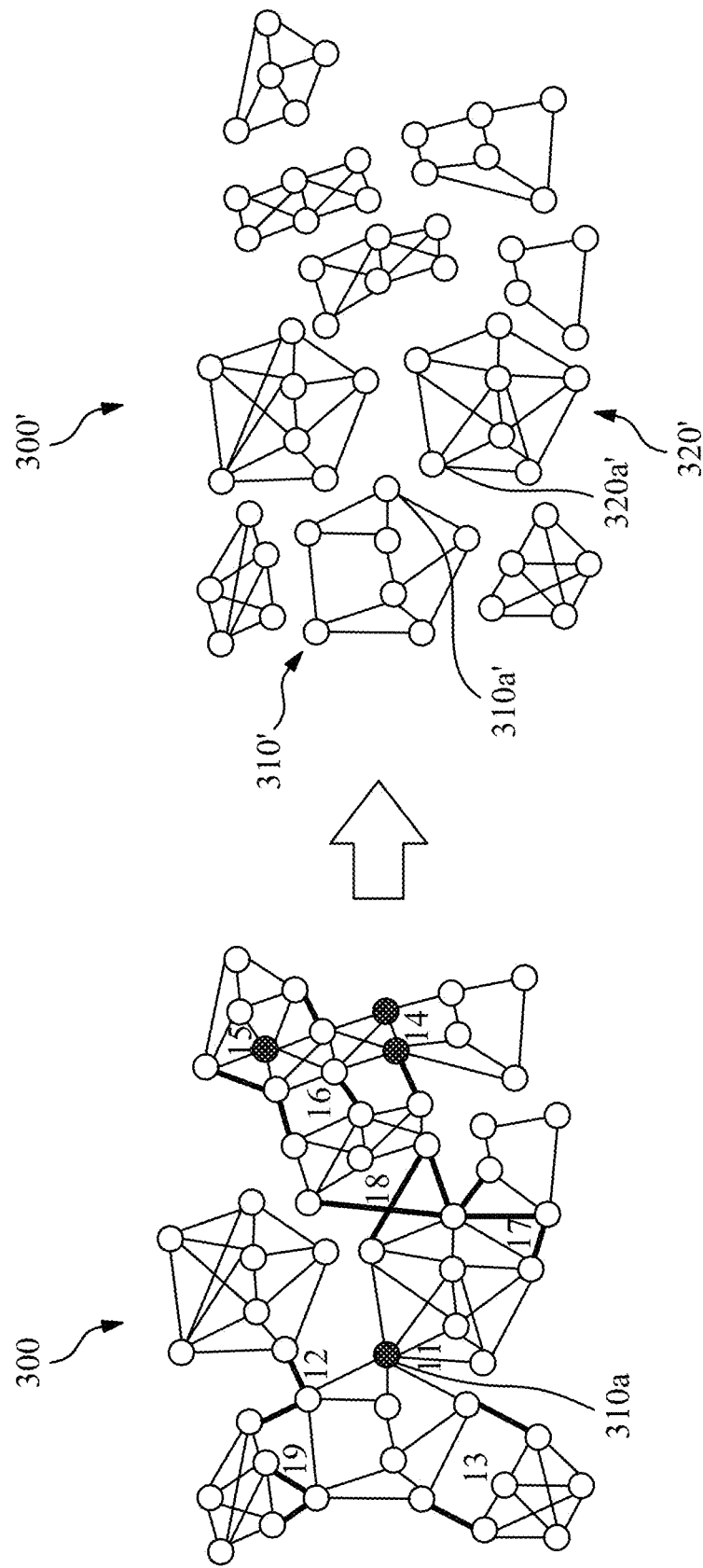
FIG. 3 is an example of partitioning of a conflict graph in accordance with some embodiments.

The following description is based on an example of four masks used to pattern the layer of the semiconductor device. FIG. 3 is an example of partitioning of a conflict graph 300 in accordance with some embodiments. Conflict graph 300 is partitioned at connections 11-19 in order to form a conflict graph 300'. Partitioning a conflict graph includes at least one of severing link(s) between groups or separating an articulation. When a conflict graph is partitioned by severing links between groups, the links are removed and a number of links connected to each node of the conflict graph is reduced accordingly. When a conflict graph is partitioned by separating an articulation, two groups which share a node are separated and the node is simulated to be part of both groups to maintain the links individually associated with each of the groups. For example, connection 11 in conflict graph 300 is a single articulation at node 310a. When connection 11 is partitioned in conflict graph 300' node 310a remains as part of group 310' as node 310a' and as part of group 320' as node 320a'. Additional examples of partition rules are provided below with the discussion of FIGS. 4-9E. The partition rules indicated in FIGS. 4-9E are examples and this description is not limited to only the explicitly depicted partition rules.

Operation 110 is performed by a specific purpose processing device configured to execute instructions for partitioning a conflict graph. In some embodiments, operation 110 is performed using a same specific purpose processing device as that used in at least one of operation 104, operation 106 or operation 108. In some embodiments, a different specific purpose processing device is used to perform operation 110 from that used to perform operation 104, operation 106 and operation 108.

Returning to FIG. 1, following partitioning of the conflict graph, method 100 returns to operation 104. If the partitioned conflict graph is determined to include nodes having less than the threshold number of links, then method 100 proceeds to operation 106. If the partitioned conflict graph is determined to include only nodes having at least the threshold number of links, then method 100 proceeds to operation 108. A number of loops of operations 104, 106, 108 and 110 is not limited. In some embodiments, less than an entire loop is completed, e.g., as depicted in FIG. 2. In some embodiments, a single loop of operations 104, 106, 108 and 110 is completed, i.e., following a single partitioning operation the conflict graph is either a simplified graph or is able to be decomposed into a simplified graph. In some embodiments, multiple loops of operations 104, 106, 108 and 110 are completed, i.e., multiple partitioning operations are performed.

If the conflict graph is determined to be a simplified conflict graph (also referred to as a simplified graph) in operation 108, the method 100 proceeds to operation 112. In operation 112, the simplified graph is analyzed to determine whether the simplified graph is colorable. In some embodiments, the simplified graph is analyzed using a rule-based analysis method. In some embodiments, the rule based analysis method is a K533 check. A K533 check identifies a simplified graph as non-colorable if the simplified graph contains a K5 conflict graph; a K33 conflict graph; or a conflict graph which is contractible to form a K5 conflict graph or a K33 conflict graph. The K533 check is discussed in more detail below with respect to FIGS. 11-13. In some embodiments, the rule-based analysis method is different from a K533 check. In some embodiments, the simplified graph is analyzed using a heuristic analysis. An example of a heuristic analysis is comparing an arrangement of the simplified graph with previously analyzed conflict graphs. In some embodiments, heuristic-based analysis focuses on a node having a most number of links in determining whether the conflict graph is colorable.

Operation 112 is performed by a specific purpose processing device configured to execute instructions for determining colorability of a simplified graph. In some embodiments, operation 112 is performed using a same specific purpose processing device as that used in at least one of operation 104, operation 106 or operation 108. In some embodiments, a different specific purpose processing device is used to perform operation 112 from that used to perform operation 104, operation 106 and operation 108.

If the simplified graph is determined to be colorable, method 100 proceeds to operation 116 and the conflict graph is reported as being colorable. In some embodiments, the report contains suggested colors for each node of the conflict graph. In some embodiments, the report is displayed to the user. In some embodiments, the report is transmitted to a separate specific purpose processing device. In some embodiments, the specific purpose processing device used to perform operation 112 generates instructions for producing a set of masks in operation 116. In some embodiments, the separate specific purpose processing device generates instructions for producing a set of masks in operation 116.

Operation 116 is performed by a specific purpose processing device configured to execute instructions for reporting a conflict graph as being colorable. In some embodiments, operation 116 is performed using a same specific purpose processing device as that used in at least one of operation 104, operation 106, operation 108 or operation 112. In some embodiments, a different specific purpose processing device is used to perform operation 116 from that used to perform operation 104, operation 106, operation 108 and operation 112.

If the simplified graph is determined to be non-colorable, method 100 proceeds to operation 114 and violations are flagged. In some embodiments, the violations are reported to the user. In some embodiments, the report includes violations highlighted in the conflict graph. In some embodiments, a specific purpose processing device performing operation 114 recommends solutions to the flagged violations. In some embodiments, the recommended solutions include increasing a distance between at least two nodes in the layer of the semiconductor device or changing a shape of at least one node in the layer of the semiconductor device.

Operation 114 is performed by a specific purpose processing device configured to execute instructions for flagging violations. In some embodiments, the specific purpose processing device is configured to execute instructions for recommending solutions. In some embodiments, operation 114 is performed using a same specific purpose processing device as that used in at least one of operation 104, operation 106, operation 108, operation 112 or operation 116. In some embodiments, a different specific purpose processing device is used to perform operation 112 from that used to perform operation 104, operation 106, operation 108, operation 112 and operation 116.

In some embodiments, method 100 is repeated following modification to the conflict graph. In some embodiments, the modification is automatically performed by the specific purpose processing device used for operation 114. In some embodiments, the modification is automatically performed by a specific purpose processing device separate from the specific purpose processing device used for operation 114. In some embodiments, the modification is based on input from the user.

The following description discusses details of partitioning rules for quadruple patterning, i.e., a layer of a semiconductor device patterned using four masks. The above description of method 100 is not intended to be limited to quadruple patterning, and the following description is used to provide a better understanding of some embodiments of the current disclosure.

In comparison with other approaches, method 100 helps to simplify a conflict graph by combining both decomposing and partitioning of the conflict graph to reduce an amount of time used to determine whether a layout for the layer of the semiconductor device is colorable. Method 100 also helps to identify violations which prevent coloring the layout in order to increase efficiency in design of the semiconductor device. The increase in design efficiency helps to increase a speed of manufacturing of the semiconductor device by reducing an amount of time between conception of the semiconductor device and production of the semiconductor device.

Figure 4:
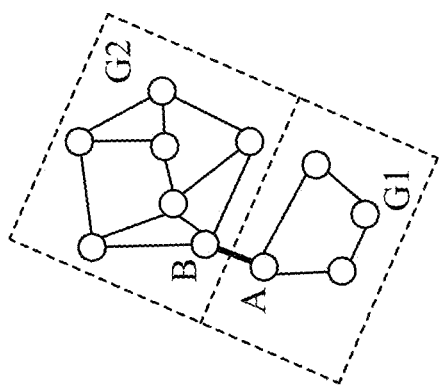
FIG. 4 is a schematic view of a single articulation connection between two groups of a conflict graph in accordance with some embodiments.

FIG. 4 is a schematic view of a single articulation connection between two groups of a conflict graph in accordance with some embodiments. Group G1 is connected to group G2 at node A/A', i.e., node A/A' is shared by both group G1 and group G2. This type of connection is called a single articulation. In order to partition group G1 from group G2, the connection at node A/A' is broken and each group, i.e., group G1 and group G2, maintains a node A or A' at the corresponding location of node A/A'. An example of partitioning a single articulation connection is explained above with respect to FIG. 3. For example, prior to partitioning, node A/A' has four links, and following partitioning, node A has two links, and node A' also has two links. Using the example of quadruple patterning, which has a threshold number of links equal to four, both node A and node A' are now capable of being decomposed as discussed above with respect to operation 106 (FIG. 1).

Figure 5:
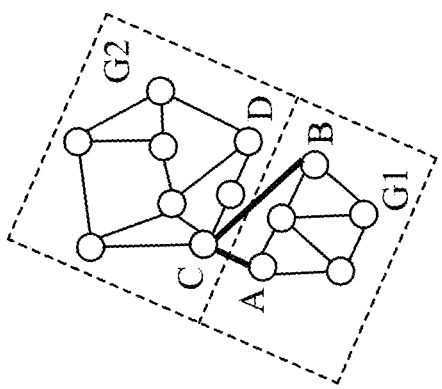
FIG. 5 is a schematic view of a single link connection between two groups of a conflict graph in accordance with some embodiments.

FIG. 5 is a schematic view of a single link connection between two groups of a conflict graph in accordance with some embodiments. Group G1 is connected to group G2 by a link between node A and node B. This type of connection is called a single link. In order to partition group G1 from group G2, the link between node A and node B is broken and a number of links associated with each of node A and node B is reduced accordingly. For example, prior to partitioning, node B has four links, and following partitioning, node B has three links. Using the example of quadruple patterning partitioned node B is capable of being decomposed.

Figure 6A:
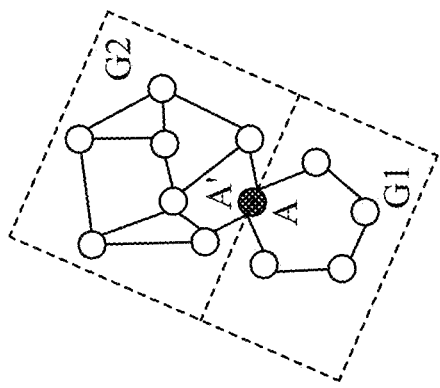
FIGS. 6A-6B are schematic views of a double link connection between two groups of a conflict graph in accordance with some embodiments.

FIG. 6A is a schematic view of a double link connection between two groups of a conflict graph in accordance with some embodiments. Group G1 is connected to group G2 by a link between node A and node C; and by a link between node B and node D. This type of connection is called a double link. In order to partition group G1 from group G2, the link between node A and node C is broken; and the link between node B and node D is broken. A number of links associated with each of nodes A, B, C and D is reduced accordingly. For example, prior to partitioning, node C has four links, and following partitioning, node C has three links. Using the example of quadruple patterning partitioned node C is capable of being decomposed.

Figure 6B:
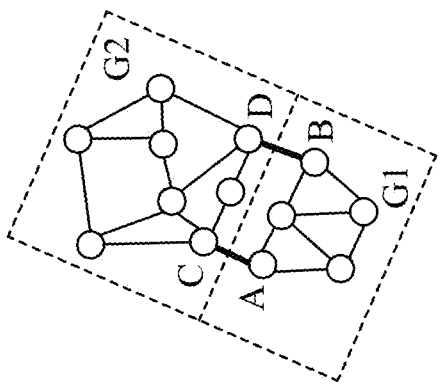

FIG. 6B is a schematic view of a double link connection between two groups of a conflict graph in accordance with some embodiments. Group G1 is connected to group G2 by a link between node A and node C; and by a link between node B and node C. This type of connection is called a double link. In comparison with FIG. 6A, node C of FIG. 6B includes two links connecting group G1 and group G2. In order to partition group G1 from group G2, the link between node A and node C is broken; and the link between node B and node C is broken. A number of links associated with each of nodes A, B and C is reduced accordingly. For example, prior to partitioning, node C has five links, and following partitioning, node C has three links. Using the example of quadruple patterning partitioned node C is capable of being decomposed.

Figure 7:
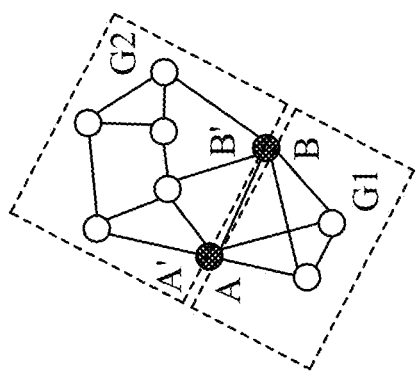
FIG. 7 is a schematic view of a double articulation connection between two groups of a conflict graph in accordance with some embodiments.

FIG. 7 is a schematic view of a double articulation connection between two groups of a conflict graph in accordance with some embodiments. Group G1 is connected to group G2 at node A/A' and at node B/B', i.e., both node A/A' and node B/B' are shared by both group G1 and group G2. This type of connection is called a double articulation. In order to partition group G1 from group G2, the connection at node A/A' is broken and the connection at node B/B' is broken. As with partitioning a single articulation, node A and node B will remain as part of group G1; and node A' and node B' will remain as part of group G2. A number of links to each of node A and node A' is reduced accordingly. Prior to partitioning, node B/B' has five links, and following partitioning, node B has three links, and node B' has three links. Using the example of quadruple patterning, both partitioned node B and partitioned node B' are capable of being decomposed.

Figure 8A:
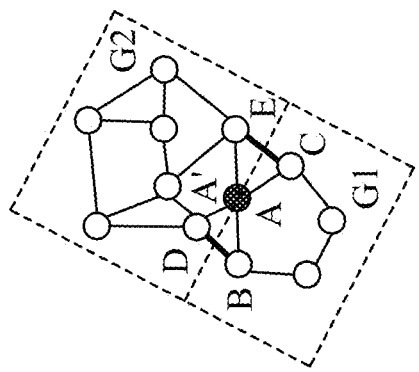
FIGS. 8A-8C are schematic views of a butterfly connection between two groups of a conflict graph in accordance with some embodiments.

FIG. 8A is schematic views of a butterfly connection between two groups of a conflict graph in accordance with some embodiments. Group G1 is connected to group G2 by an articulation at node A/A'; by a link between node B and node D; and by a link between node C and node E. Links between group G1 and group G2 on both sides of the articulated node A/A' are adjacent to the articulated node. This type of connection is called a butterfly connection. In order to partition group G1 from group G2, articulated node A/A' is partitioned in a manner similar to a single articulation as discussed above. In addition, the link between node B and node D as well as the link between node C and node E are broken in a manner similar to a double link as discussed above. A number of links associated each of nodes A, A', B, C, D and E is reduced accordingly. For example, prior to partitioning, node A/A' has four links, and following partitioning, node A has two links, and node A' has two links. Also, prior to partitioning node E has four links, and following partitioning node E has three links. Using the example of quadruple patterning all of partitioned node A, partitioned node A' and partitioned node E are capable of being decomposed.

Figure 8B:
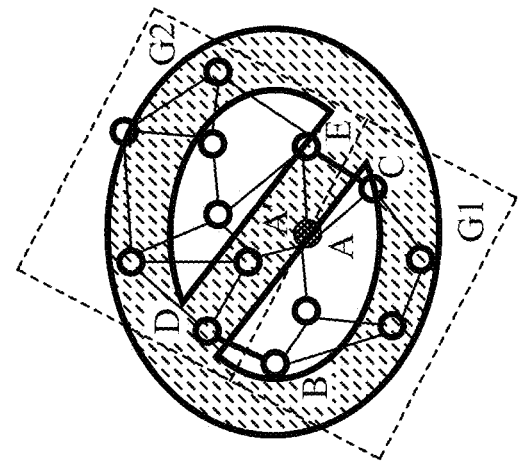

FIG. 8B is schematic views of a butterfly connection between two groups of a conflict graph in accordance with some embodiments. Group G1 is connected to group G2 by an articulation at node A/A'; by a link between node B and node D; and by a link between node C and node E. At least one links between group G1 and group G2 on both sides of the articulated node A/A' are adjacent to the articulated node. In comparison with FIG. 8A, the link between node C and node E in group G2 is not adjacent to articulated node A/A'; and the link between node B and node D in group G2 is not adjacent to the articulated node. However, the link between node C and node E in group G1 remains adjacent to articulated node A/A'; and the link between node B and node D in group G1 also remains adjacent to the articulated node. Thus, links between group G1 and group G2 on both sides of articulated node A/A' are adjacent to the articulated node. Therefore, this type of connection is also called a butterfly connection. In order to partition group G1 from group G2, articulated node A/A' is partitioned in a manner similar to a single articulation as discussed above. In addition, the link between node B and node D as well as the link between node C and node E are broken in a manner similar to a double link as discussed above. A number of links associated each of nodes A, A', B, C, D and E is reduced accordingly. For example, prior to partitioning, node A/A' has five links, and following partitioning, node A has three links, and node A' has two links. Also, prior to partitioning, node E has three links, and following partitioning node E has two links. Using the example of quadruple patterning all of partitioned node A, partitioned node A' and partitioned node E are capable of being decomposed.

Figure 8C:
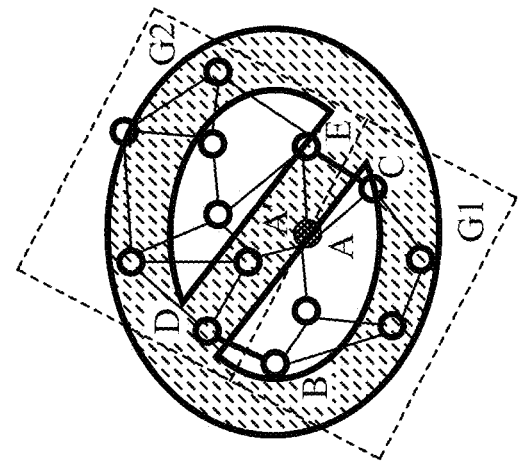

FIG. 8C is schematic views of a butterfly connection between two groups of a conflict graph in accordance with some embodiments. Group G1 is connected to group G2 by an articulation at node A/A'; by a link between node B and node D; and by a link between node C and node E. At least one links between group G1 and group G2 on both sides of the articulated node A/A' are adjacent to the articulated node. In comparison with FIG. 8A, the link between node C and node E in group G1 is not adjacent to articulated node A/A'; and the link between node B and node D in group G2 is not adjacent to the articulated node. However, the link between node C and node E in group G2 remains adjacent to articulated node A/A'; and the link between node B and node D in group G1 also remains adjacent to the articulated node. Thus, links between group G1 and group G2 on both sides of articulated node A/A' are adjacent to the articulated node. Therefore, this type of connection is also called a butterfly connection. In order to partition group G1 from group G2, articulated node A/A' is partitioned in a manner similar to a single articulation as discussed above. In addition, the link between node B and node D as well as the link between node C and node E are broken in a manner similar to a double link as discussed above. A number of links associated each of nodes A, A', B, C, D and E is reduced accordingly. For example, prior to partitioning, node A/A' has six links, and following partitioning, node A has three links, and node A' has three links. Also, prior to partitioning, node E has four links, and following partitioning node E has three links. Using the example of quadruple patterning all of partitioned node A, partitioned node A' and partitioned node E are capable of being decomposed.

Figure 8D:
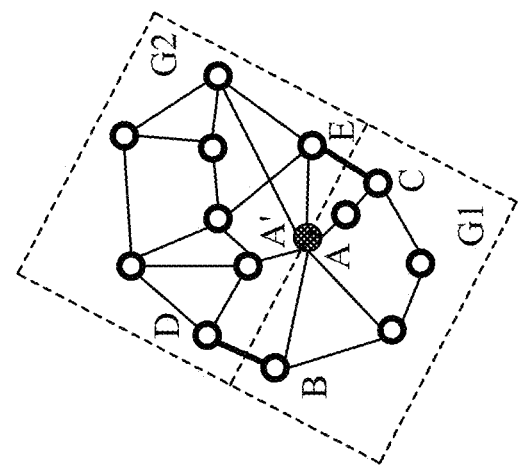
FIG. 8D is a schematic view of a non-partitionable connection between two groups in a conflict graph in accordance with some embodiments.

FIG. 8D is a schematic view of a non-partitionable connection between two groups in a conflict graph in accordance with some embodiments. Group G1 is connected to group G2 by an articulation at node A/A'; by a link between node B and node D; and by a link between node C and node E. In comparison with FIG. 8A, the link between node C and node E in group G1 and in group G2 are adjacent to articulated node A/A'. However, the link between node B and node D in group G1 and in group G2 is not adjacent to articulated node A/A'. Thus, FIG. 8D does not have links between group G1 and group G2 on both sides of articulated node A/A' adjacent to the articulated node. Therefore, this type of connection does not qualify as a butterfly connection. As a result, the conflict graph in FIG. 8D is not capable of being partitioned.

Figure 9E:
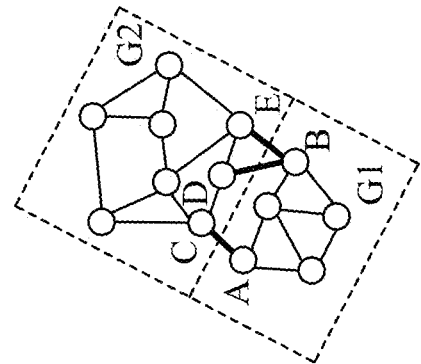
FIGS. 9A-9E are schematic views of a triple link connection between two groups in a conflict graph in accordance with some embodiments.
Figure 9B:
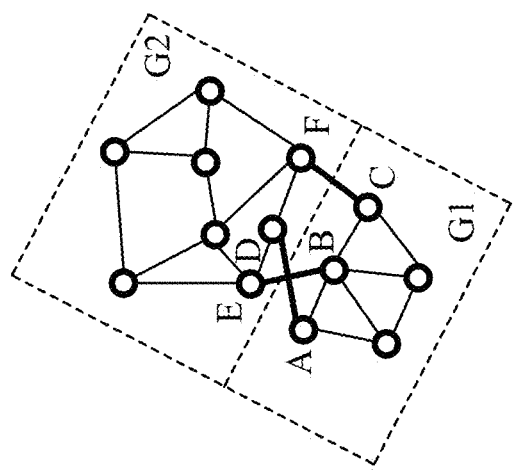
Figure 9D:
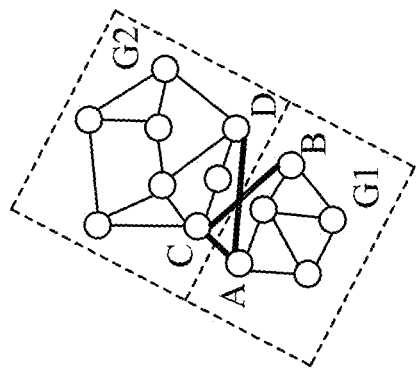
Figure 9A:
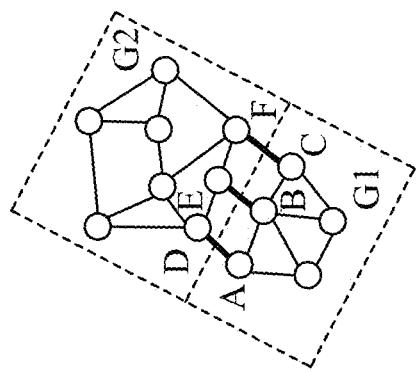

FIG. 9A is a schematic view of a triple link connection between two groups in a conflict graph in accordance with some embodiments. Group G1 is connected to group G2 by a link between node A and node D; a link between node B and node E; and a link between node C and node F. This type of connection is called a triple link. In order to partition group G1 from group G2, each of the link between node A and node D; the link between node B and node E; and the link between node C and node F is broken. A number of links associated with each of nodes A, B, C, D, E and F is reduced accordingly. For example, prior to partitioning, node C has four links, and following partitioning, node C has three links. Using the example of quadruple patterning, partitioned node C is capable of being decomposed.

FIG. 9B is a schematic view of a triple link connection between two groups in a conflict graph in accordance with some embodiments. Group G1 is connected to group G2 by a link between node A and node D; a link between node B and node E; and a link between node C and node F. In comparison with FIG. 9A, the link between node A and node D crosses the link between node B and node E. This type of connection is also called a triple link. In order to partition group G1 from group G2, each of the link between node A and node D; the link between node B and node E; and the link between node C and node F is broken. A number of links associated with each of nodes A, B, C, D, E and F is reduced accordingly. For example, prior to partitioning, node C has four links, and following partitioning, node C has three links. Using the example of quadruple patterning, partitioned node C is capable of being decomposed.

Figure 9C:
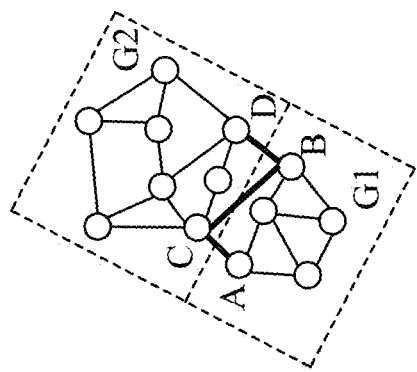

FIG. 9C is a schematic view of a triple link connection between two groups in a conflict graph in accordance with some embodiments. Group G1 is connected to group G2 by a link between node A and node C; a link between node B and node C; and a link between node B and node D. In comparison with FIG. 9A, two links are connected to node C. This type of connection is also called a triple link. In order to partition group G1 from group G2, each of the link between node A and node C; the link between node B and node C; and the link between node B and node D is broken. A number of links associated with each of nodes A, B, C and D is reduced accordingly. For example, prior to partitioning, node C has five links, and following partitioning, node C has three links. Using the example of quadruple patterning, partitioned node C is capable of being decomposed.

FIG. 9D is a schematic view of a triple link connection between two groups in a conflict graph in accordance with some embodiments. Group G1 is connected to group G2 by a link between node A and node C; a link between node B and node C; and a link between node A and node D. In comparison with FIG. 9A, two links are connected to node C; and two links are connected to node A. This type of connection is also called a triple link. In order to partition group G1 from group G2, each of the link between node A and node C; the link between node B and node C; and the link between node A and node D is broken. A number of links associated with each of nodes A, B, C and D is reduced accordingly. For example, prior to partitioning, node C has five links, and following partitioning, node C has three links. Using the example of quadruple patterning, partitioned node C is capable of being decomposed.

FIG. 9E is a schematic view of a triple link connection between two groups in a conflict graph in accordance with some embodiments. Group G1 is connected to group G2 by a link between node A and node C; a link between node B and node D; and a link between node B and node E. In comparison with FIG. 9A, two links are connected to node B. This type of connection is also called a triple link. In order to partition group G1 from group G2, each of the link between node A and node C; the link between node B and node D; and the link between node B and node E is broken. A number of links associated with each of nodes A, B, C and D is reduced accordingly. For example, prior to partitioning, node E has four links, and following partitioning, node E has three links. Using the example of quadruple patterning, partitioned node E is capable of being decomposed.

Figure 10:
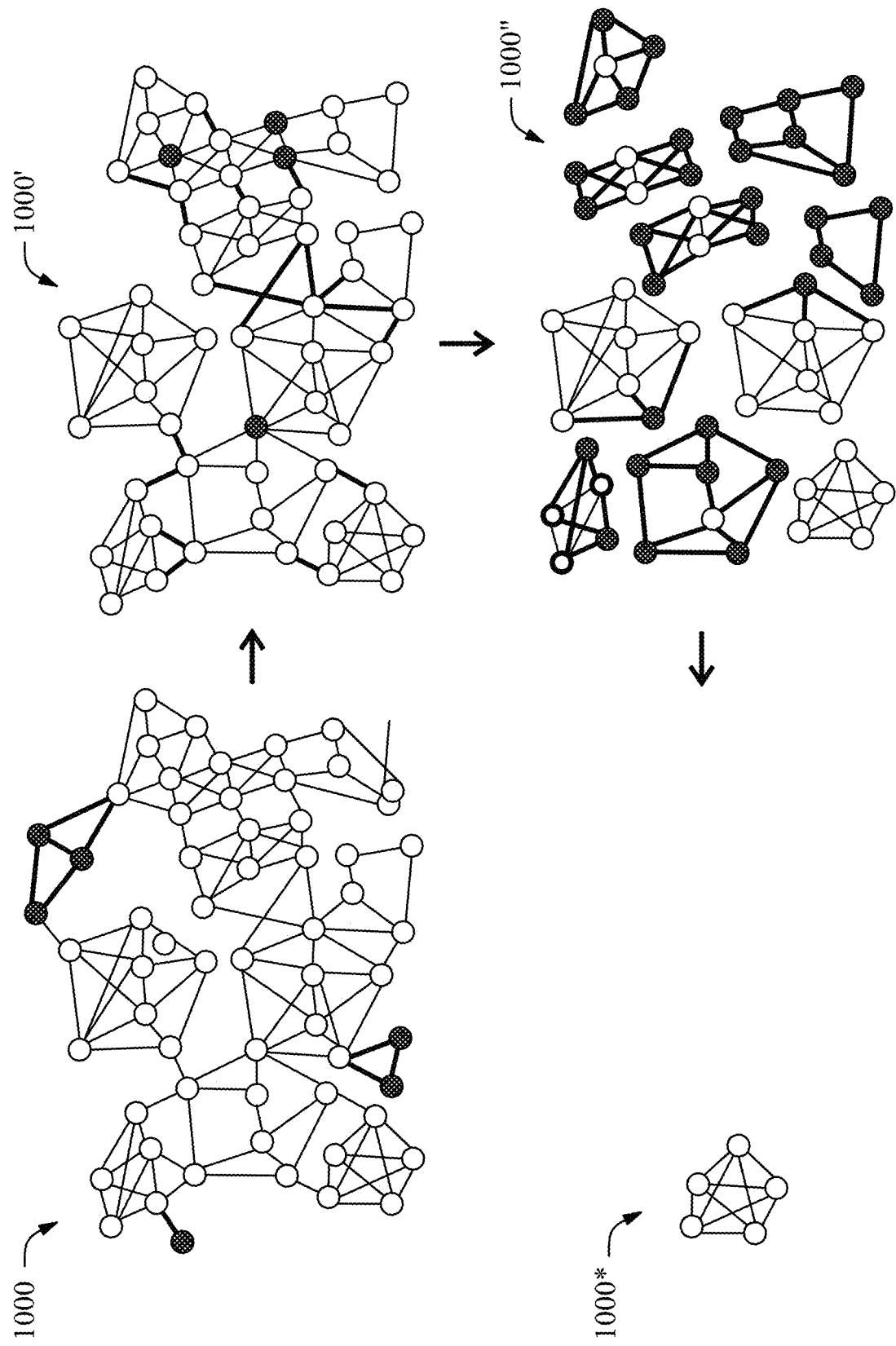
FIG. 10 is a sample implementation of the method of FIG. 1 in accordance with some embodiments.

FIG. 10 is a sample implementation of the method 100 (FIG. 1) in accordance with some embodiments. Conflict graph 1000 is received by a specific purpose processing device in operation 102.

Nodes having a number of links less than the threshold value, i.e., the threshold value is four in the example of FIG. 10, are identified in operation 104. In operation 106, conflict graph 1000 is decomposed to form a decomposed conflict graph 1000'. In operation 108, decomposed conflict graph 1000' is determined not to be a simplified graph due to the ability of decomposed conflict graph 1000' to be partitioned.

In operation 110, decomposed conflict graph 1000' is partitioned to form a partitioned conflict graph 1000". The partitioning of decomposed conflict graph 1000' is based on the quadruple patterning partitioning rules described above with respect to FIGS. 4-9E. Returning to operation 104, partitioned conflict graph 1000" is determined to include nodes having less than the threshold number of links. Therefore, method 100 proceeds again to operation 106 in which partitioned conflict graph 1000" is decomposed to form a conflict graph 1000*. In operation 108, conflict graph 1000* is determined to be a simplified graph because the conflict graph is determined to be incapable of further partitioning.

In operation 112, conflict graph 1000* is determined to be non-colorable because conflict graph 1000* is a K5 conflict graph. In operation 114, the violation of conflict graph 1000* is flagged.

Figure 11:
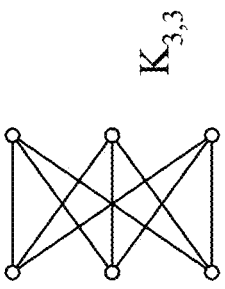
FIG. 11 is a schematic view of a K5 conflict graph in accordance with some embodiments.

FIG. 11 is a schematic view of a K5 conflict graph in accordance with some embodiments. A K5 conflict graph is a conflict graph having five nodes, wherein each of the five nodes is linked to every other node of the conflict graph. FIG. 11 is only an example of a K5 conflict graph provided for the sake of clarity. Additional arrangements of five nodes, where every node of the five nodes is connected to every other node in the conflict graph, are also possible.

Figure 12:
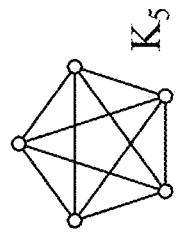
FIG. 12 is a schematic view of a K33 conflict graph in accordance with some embodiments.

FIG. 12 is a schematic view of a K33 conflict graph in accordance with some embodiments. A K33 conflict graph is a conflict graph having 3 nodes in a first column and 3 nodes in a second column, where every node in the first column is connected to every node in the second column. FIG. 12 is only an example of a K33 conflict graph provided for the sake of clarity. Additional arrangements of three nodes in a first column and three nodes in a second column, where every node in the first column is connected to every node in the second column, are also possible.

Figure 13:
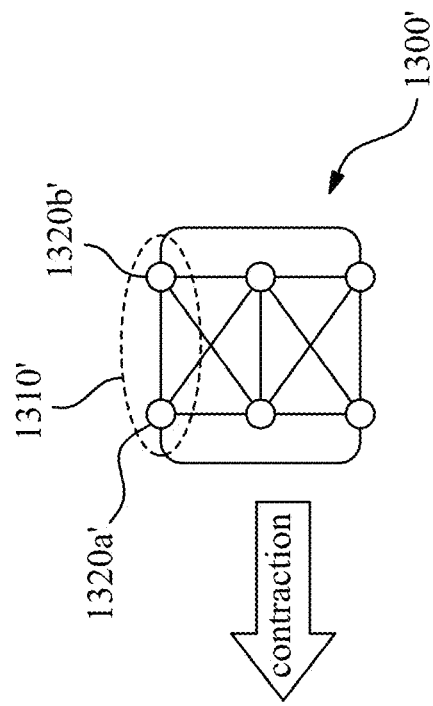
FIG. 13 is a schematic view of conflict graphs which are contractible to form a K5 conflict graph in accordance with some embodiments.
Figure 13:
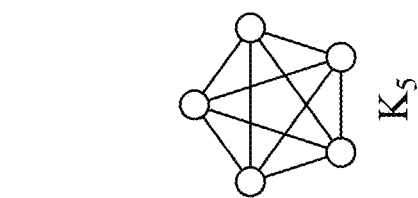
Figure 13:
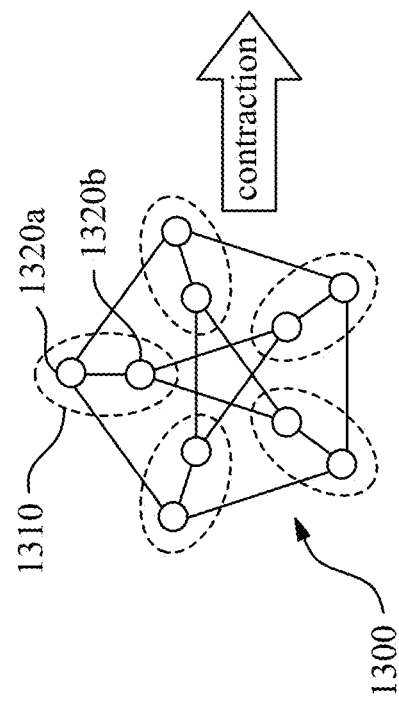

FIG. 13 is a schematic view of conflict graphs which are contractible to form a K5 conflict graph in accordance with some embodiments. Contraction of a conflict graph includes removing at least one link and merging the nodes connected to that link. For example, removing link 1310 from conflict graph 1300 and merging node 1320a and node 1320b. If this contracting process is repeated for each of the highlighted links in conflict graph 1300, then conflict graph 1300 is contractible to form a K5 conflict graph.

With respect to conflict graph 1300', if link 1310' is removed and node 1320a' and node 1320b' are merged, then conflict graph 1300' is also contractible to form a K5 conflict graph. In some embodiments, operation 112 (FIG. 1) uses a K533 rule to determine whether a conflict graph is colorable. As discussed above, a conflict graph which is contractible to form a K5 conflict graph or a K33 conflict graph is not colorable for quadruple patterning.

Figure 14:
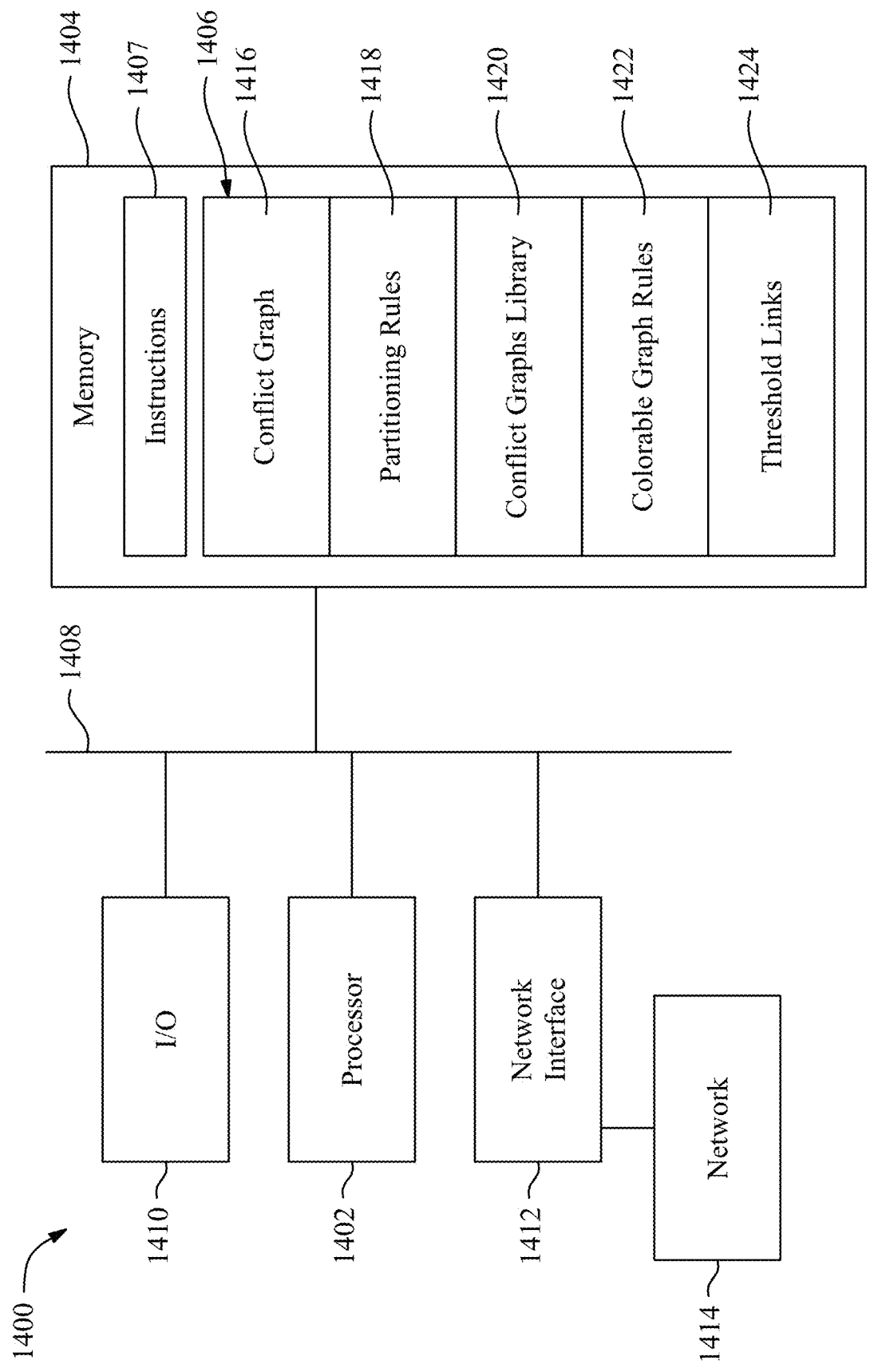
FIG. 14 is a block diagram of a system for determining colorability of a semiconductor device in accordance with some embodiments.

FIG. 14 is a block diagram of a system 1400 for designing a semiconductor device in accordance with some embodiments. System 1400 includes a specific purpose hardware processor 1402 and a non-transitory, computer readable storage medium 1404 encoded with, i.e., storing, the computer program code 1406, i.e., a set of executable instructions. In some embodiments, processor 1402 is called a specific purpose processing device. Computer readable storage medium 1404 is also encoded with instructions 1407 for interfacing with manufacturing machines for designing or analyzing the semiconductor device. The processor 1402 is electrically coupled to the computer readable storage medium 1404 via a bus 1408. The processor 1402 is also electrically coupled to an I/O interface 1410 by bus 1408. A network interface 1412 is also electrically connected to the processor 1402 via bus 1408. Network interface 1412 is connected to a network 1414, so that processor 1402 and computer readable storage medium 1404 are capable of connecting to external elements via network 1414. The processor 1402 is configured to execute the computer program code 1406 encoded in the computer readable storage medium 1404 in order to cause system 1400 to be usable for performing a portion or all of the operations as described in method 100.

In some embodiments, the processor 1402 is a central processing unit (CPU), a multi-processor, a distributed processing system, an application specific integrated circuit (ASIC), and/or a suitable processing unit.

In some embodiments, the computer readable storage medium 1404 is an electronic, magnetic, optical, electromagnetic, infrared, and/or a semiconductor system (or apparatus or device). For example, the computer readable storage medium 1404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1404 includes a compact disk-read only memory (CD-ROM), a compact disk-read/write (CD-R/W), and/or a digital video disc (DVD).

In some embodiments, the storage medium 1404 stores the computer program code 1406 configured to cause system 1400 to perform method 100. In some embodiments, the storage medium 1404 also stores information needed for performing a method 100 as well as information generated during performing the method 100, such as a conflict graph parameter 1416, a partitioning rules parameter 1418, a conflict graphs library parameter 1420, a colorable graph rules parameter 1422, a threshold links parameter 1424 and/or a set of executable instructions to perform the operation of method 100.

In some embodiments, the storage medium 1404 stores instructions 1407 for interfacing with manufacturing machines. The instructions 1407 enable processor 1402 to generate manufacturing instructions readable by the manufacturing machines to effectively implement method 100 during a manufacturing process.

System 1400 includes I/O interface 1410. I/O interface 1410 is coupled to external circuitry. In some embodiments, I/O interface 1410 includes a keyboard, keypad, mouse, trackball, trackpad, and/or cursor direction keys for communicating information and commands to processor 1402.

System 1400 also includes network interface 1412 coupled to the processor 1402. Network interface 1412 allows system 1400 to communicate with network 1414, to which one or more other computer systems are connected. Network interface 1412 includes wireless network interfaces such as BLUETOOTH, WIFI, WIMAX, GPRS, or WCDMA; or wired network interface such as ETHERNET, USB, or IEEE-1394. In some embodiments, method 100 is implemented in two or more systems 1400, and information such as conflict graph, partitioning rules, conflict graph libraries or colorable graph rules are exchanged between different systems 1400 via network 1414.

System 1400 is configured to receive information related to a conflict graph through I/O interface 1410 or network interface 1412. In some embodiments, system 1400 is configured to receive information related to a layout through I/O interface 1410 or network interface 1412; and processor 1402 is configured to generate the conflict graph information based on the received layout. The conflict graph information is then stored in computer readable medium 1404 as conflict graph parameter 1416. System 1400 is configured to receive information related to partitioning rules through I/O interface 1410 or network interface 1412. The information is stored in computer readable medium 1404 as portioning rules parameter 1418. System 1400 is configured to receive information related to conflict graph libraries through I/O interface 1410 or network interface 1412. The information is stored in computer readable medium 1404 as conflict graph library parameter 1420. System 1400 is configured to receive information related to colorable graph rules through I/O interface 1410 or network interface 1412. The information is stored in computer readable medium 1404 as colorable graph rules parameter 1422. System 1400 is configured to receive information related to a threshold number of links through I/O interface 1410 or network interface 1412. In some embodiments, processor 1402 is configured to determine the threshold number of links based on a number of masks to be used to pattern a layer in the semiconductor device. The information is stored in computer readable medium 1404 as threshold links parameter 1424.

During operation, in some embodiments, processor 1402 executes a set of instructions to analyze a conflict graph based on conflict graph parameter 1416. For example, in operation 104 (FIG. 1), processor 1402 is configured to execute instructions to determine if any nodes of conflict graph parameter 1416 have less than a threshold number of links based on threshold links parameter 1424. In operation 106, processor 1402 is configured to execute instructions for iteratively decomposing a conflict graph based on conflict graph parameter 1416 and threshold links parameter 1424. In operation 108, processor 1402 is configured to execute instructions to determine whether a decomposed conflict graph is a simplified graph based on conflict graph parameter 1416 and conflict graphs library parameter 1420. In operation 110, processor 1402 is configured to execute instructions to partition a conflict graph based on conflict graph parameter 1416 and partitioning rules parameter 1418. In operation 112, processor 1402 is configured to execute instructions to determine if a conflict graph is colorable based on conflict graph parameter 1416 and at least one of conflict graphs library 1418 or colorable graph rules 1422.

An aspect of this description relates to a method including decomposing a conflict graph based on a number of masked to be used to manufacture a semiconductor device. The method further includes determining whether the decomposed conflict graph is a simplified graph based on a comparison between the decomposed conflict graph and a stored conflict graph. The method further includes determining whether the decomposed conflict graph is colorable based on a number of masks used to pattern the layer of the semiconductor device. The method further includes indicating that the conflict graph is colorable in response to a determination that the decomposed conflict graph is colorable. In some embodiments, the method further includes manufacturing at least one mask in response to a determination that the decomposed conflict graph is colorable. In some embodiments, decomposing the conflict graph includes removing nodes having a number of links below a threshold value in an iterative process. In some embodiments, determining whether the decomposed conflict graph is the simplified graph includes comparing the decomposed conflict graph following each iteration of the decomposing. In some embodiments, the method further includes stopping the decomposing in response to a determination that the decomposed conflict graph is the simplified graph. In some embodiments, the method further includes partitioning the decomposed conflict graph after each iteration of decomposing in response to a determination that the decomposed conflict graph is different from the simplified graph. In some embodiments, the method further includes setting the threshold value based on a number of masks used for manufacturing a semiconductor device. In some embodiments, the method further includes suggesting modifications to the conflict graph in response to the flagging the violations.

An aspect of this description relates to a system for determining colorability of a layer of a semiconductor device. The system includes a non-transitory computer readable medium configured to store instructions thereon. The system further includes a processor connected to the non-transitory computer readable medium. The processor is configured to execute the instructions for decomposing a conflict graph based on a number of masked to be used to manufacture a semiconductor device. The processor is configured to execute the instructions for determining whether the decomposed conflict graph is a simplified graph based on a comparison between the decomposed conflict graph and a stored conflict graph. The processor is configured to execute the instructions for determining whether the decomposed conflict graph is colorable based on a number of masks used to pattern the layer of the semiconductor device. The processor is configured to execute the instructions for indicating that the conflict graph is colorable in response to a determination that the decomposed conflict graph is colorable. In some embodiments, the processor is configured to cease decomposing of the conflict graph in response to a determination that the decomposed conflict graph is the simplified graph. In some embodiments, the processor is configured to execute the instructions for interfacing with at least one machine for manufacturing the layer of the semiconductor device in response to a determination that the decomposed conflict graph is colorable. In some embodiments, the processor is configured to execute the instructions for partitioning the conflict graph. In some embodiments, the processor is configured to execute the instructions for partitioning the conflict graph following each iteration of decomposing of the conflict graph. In some embodiments, the processor is configured to execute the instructions for decomposing the conflict graph by removing nodes having a number of links below a threshold value. In some embodiments, the processor is configured to execute the instructions for modifying the conflict graph in response to a determination that the decomposed conflict graph is non-colorable; and decomposing the modified conflict graph. In some embodiments, the processor is configured to execute the instructions for notifying a user of the flagged violations.

An aspect of this description relates to a method of determining colorability of a layer of a semiconductor device. The method includes determining a threshold number of links based on a number of masks for manufacturing the semiconductor device. The method further includes generating a conflict graph based on a location of elements within the semiconductor device. The method further includes iteratively decomposing the conflict graph to remove nodes having fewer links than the threshold number of links. The method includes comparing the decomposed conflict graph and a stored conflict graph. The method further includes determining whether the conflict graph is colorable based on the comparison. The method further includes flagging violations in response to a determination that the decomposed conflict graph is not colorable. In some embodiments, the method further includes manufacturing at least one mask in response to a determination that the conflict graph is colorable. In some embodiments, the method further includes partitioning a partially decomposed conflict graph between iterations of decomposing the conflict graph. In some embodiments, the method further includes stopping the decomposing of the conflict graph in response to a determination that the decomposed conflict graph is colorable.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    decomposing a conflict graph based on a number of masks to be used to manufacture a semiconductor device;
    determining whether the decomposed conflict graph is a simplified graph based on a comparison between the decomposed conflict graph and a stored conflict graph;
    determining whether the decomposed conflict graph is colorable based on a number of masks used to pattern a layer of the semiconductor device; and
    indicating that the conflict graph is colorable in response to a determination that the decomposed conflict graph is colorable.

2. The method of claim 1, further comprising: manufacturing at least one mask in response to a determination that the decomposed conflict graph is colorable.

3. The method of claim 1, wherein decomposing the conflict graph comprises removing nodes having a number of links below a threshold value in an iterative process.

4. The method of claim 3, wherein determining whether the decomposed conflict graph is the simplified graph comprises comparing the decomposed conflict graph following each iteration of the decomposing.

5. The method of claim 3, further comprising stopping the decomposing in response to a determination that the decomposed conflict graph is the simplified graph.

6. The method of claim 3, further comprising partitioning the decomposed conflict graph after each iteration of decomposing in response to a determination that the decomposed conflict graph is different from the simplified graph.

7. The method of claim 3, further comprising setting the threshold value based on a number of masks used for manufacturing a semiconductor device.

8. The method of claim 1, further comprising suggesting modifications to the conflict graph in response to flagging the violations.

9. A system for determining colorability of a layer of a semiconductor device, the system comprising:
    a non-transitory computer readable medium configured to store instructions thereon; and
    a processor connected to the non-transitory computer readable medium, wherein the processor is configured to execute the instructions for:
        decomposing a conflict graph based on a number of masks to be used to manufacture a semiconductor device;
        determining whether the decomposed conflict graph is a simplified graph based on a comparison between the decomposed conflict graph and a stored conflict graph;
        determining whether the decomposed conflict graph is colorable based on a number of masks used to pattern the layer of the semiconductor device; and
        indicating that the conflict graph is colorable in response to a determination that the decomposed conflict graph is colorable.

10. The system of claim 9, wherein the processor is configured to cease decomposing of the conflict graph in response to a determination that the decomposed conflict graph is the simplified graph.

11. The system of claim 9, wherein the processor is configured to execute the instructions for interfacing with at least one machine for manufacturing the layer of the semiconductor device in response to a determination that the decomposed conflict graph is colorable.

12. The system of claim 9, wherein the processor is configured to execute the instructions for partitioning the conflict graph.

13. The system of claim 12, wherein the processor is configured to execute the instructions for partitioning the conflict graph following each iteration of decomposing of the conflict graph.

14. The system of claim 9, wherein the processor is configured to execute the instructions for decomposing the conflict graph by removing nodes having a number of links below a threshold value.

15. The system of claim 9, wherein the processor is configured to execute the instructions for:
    modifying the conflict graph in response to a determination that the decomposed conflict graph is non-colorable; and
    decomposing the modified conflict graph.

16. The system of claim 9, wherein the processor is configured to execute the instructions for notifying a user of flagged violations.

17. A method of determining colorability of a layer of a semiconductor device, the method comprising:
    determining a threshold number of links based on a number of masks for manufacturing the semiconductor device;
    generating a conflict graph based on a location of elements within the semiconductor device;
    iteratively decomposing the conflict graph to remove nodes having fewer links than the threshold number of links;
    comparing the decomposed conflict graph and a stored conflict graph;
    determining whether the conflict graph is colorable based on the comparison; and
    flagging violations in response to a determination that the decomposed conflict graph is not colorable.

18. The method of claim 17, further comprising manufacturing at least one mask in response to a determination that the conflict graph is colorable.

19. The method of claim 17, further comprising partitioning a partially decomposed conflict graph between iterations of decomposing the conflict graph.

20. The method of claim 17, further comprising stopping the decomposing of the conflict graph in response to a determination that the decomposed conflict graph is colorable.

* * * * *